United States Patent [19]

Yano et al.

[11] 4,347,903
[45] Sep. 7, 1982

[54] ELECTRONIC READING BALANCE

[75] Inventors: Shozo Yano; Toshiyuki Miyake; Yasuhiro Fujinaga; Akira Koomoto; Toshio Kawara; Akio Yagi; Tomohiro Tsuji; Tadashi Nagaoka, all of Kyoto, Japan

[73] Assignee: Shimadzu Corporation, Kyoto, Japan

[21] Appl. No.: 192,529

[22] PCT Filed: Jul. 5, 1979

[86] PCT No.: PCT/JP79/00178
§ 371 Date: Mar. 10, 1980
§ 102(e) Date: Feb. 5, 1980

[87] PCT Pub. No.: WO80/00272
PCT Pub. Date: Feb. 21, 1980

[30] Foreign Application Priority Data

Jul. 10, 1978 [JP] Japan .................................. 53/84696

[51] Int. Cl.[3] ...................... G01G 19/04; G01G 23/10; G06F 7/28
[52] U.S. Cl. ...................................... 177/25; 177/185; 364/734
[58] Field of Search ................... 177/25, 185, DIG. 8; 364/734

[56] References Cited

U.S. PATENT DOCUMENTS 4,102,421 7/1978 Ozaki et al. .......................... 177/185
4,137,568 1/1979 Dlugos ............................... 177/25 X
4,231,439 11/1980 Hall, Jr. et al. .................. 177/185 X Primary Examiner—George H. Miller, Jr.
Attorney, Agent, or Firm—George B. Oujevolk

[57] ABSTRACT

A weighing balance to provide an average weight to an object which tends to move while being weighed such as a laboratory animal. The object to be weighed is placed on a receiving pan which provides an electrical analog output signal corresponding to the weight of the object. This signal after passing through an amplifier is converted to a digital electrical signal fed to a data input control means. A level detector setting means allows an output from said control means only when the weight on the balance reaches a predetermined level. The output from the control means is fed to a memory having a plurality of registers which store this information. Coupled on one side to this memory is a comparator which is also coupled on a second side to said control means. Also coupled to said comparator means is an allowable range means, sampling time means, and average calculating means. The average calculating means feeds an output to a printer.

3 Claims, 2 Drawing Figures

ELECTRONIC READING BALANCE

BACKGROUND OF THE INVENTION

This invention relates to an improved electronic reading balance composed of an electronic weight detector, a weight measuring amplifier, and other electronic units, capable of electronically processing any measuring data.

BRIEF DESCRIPTION OF THE PRIOR ART

Electronic reading balances are now broadly used in many fields of testing and studying and are also actively used in the fields of medical science and pharmacy for measuring the body weight of experimental animals such as mice in toxic tests, etc.

In this case, however, occasionally an experimental animal whose body weight is being measured moves on the pan of a balance, preventing accurate measurement of its body weight due to vibration caused thereby, so that a combination of weighing means such as an integrator and a voltage/pulse counter are used to take a sampling of data every 0.2 second totalling 10 times in 2 seconds as an example of measuring data and to integrate the information in the output circuit of an electronic reading balance and then a digital average calculating means is used to average the data of 10 times which has been integrated. This information is what is used to measure the body weight of experimental animals.

The movements of animals, however, are random and not suitable for this purpose and their movements fluctuate considerably especially just after giving them medication, causing variations of measurements. For this reason, even if the varying measurements are taken by sampling 10 times per 0.2 second and then averaged to obtain the integrated values as hereinbefore, it is impossible to prevent variations of measurements. Thus, as extremely large values and extremely small values are to be included in the sampling of 10 times, the calculated average value may possibly have a large error.

It has therefore been proposed to take a varying level detection control means with band/pass filters which functions to cut away any measurements over an allowable range of value of variation. Such means, however, may possible be of complicated construction with expensive costs. Further, it is not determining the true average value statistically to cut away the maximum and minimum values without respect of stability of indication. Therefore, adopting the control means does not perform the function as desired.

In electronic reading balances used as quality-control instruments in production lines of factories except for the aforementioned electronic reading balance for weighing the weight of animals, some average calculating means like that aforementioned is provided to prevent the values from being affected by vibration and wind depending on the installation conditions in the factory. Thus, the average calculating means is used to indicate the average value in case the indicative measurement of balance is subject to vibration which will not be settled in a short time, preventing proper reading out and printing out. Also in this case, however, a large error may be involved depending on the degree of external disturbances.

OBJECTS OF THE INVENTION

Accordingly, it is a primary object of the present invention to provide an electronic reading balance capable of solving problems that conventional electronic reading balances have which inevitably indicate erroneous average value differing from the true average value due to some variance of data because the devices contemplated herein function to integrate all the data subjected to sampling of varying measurements caused by any external disturbances such as vibration, etc. during an averaging time and average them to provide the arithmetic average, thus improving the accuracy of measurement of electronic reading balance.

Furthermore, it is other object of the present invention to provide an electronic reading balance capable of making it easier to read out the measurements with higher accuracy.

The electronic reading balance of the present invention functions to make the sampling of measurements in a definite interval of time, memorize them, and compare the newest sampling data with previous sampling data memorized up to the number of units set in advance. In case there are any differences between them over the allowable range of value previously set, it functions to eliminate all the memorized sampling data and repeat the sequence of sampling and comparison, and that during the time a unit sign such as "g" blinks on the indicator. When the difference between all the sampling data of the previously set has come into the allowable range of values, that is, when the variance between the data taken has settled into the allowable range of values and the comparing means has detected that the amount of vibration of the balance has settled within the stabilizing condition, it functions to start to integrate the memorized sampling data for the first time, calculate the average of them, and indicate the calculated average value as the true measured value.

As mentioned above, the electronic reading balance relating to the present invention differs from that of conventional ones which function to calculate the arithmetic average only, that is, it functions to start to calculate the average of the measurements of sampling data immediately when the vibration of balance has got into the allowable range of value stably and the variance of data has been decreased within the allowable range of value previously set, and then it averages the measurements of data, so that it is capable of obtaining nearly a true average value and it increases the accuracy of measurement of electronic reading balance.

As another advantage, it functions to keep a unit sign such as "g" blinking on the indicator during the waiting time from starting of sampling to finishing of calculating the average, which prevents erroneously reading out varying values and easily allows only the read out indicating the average value, that is, the measured value.

DETAILED DESCRIPTION OF THE INVENTION

Figure 1:
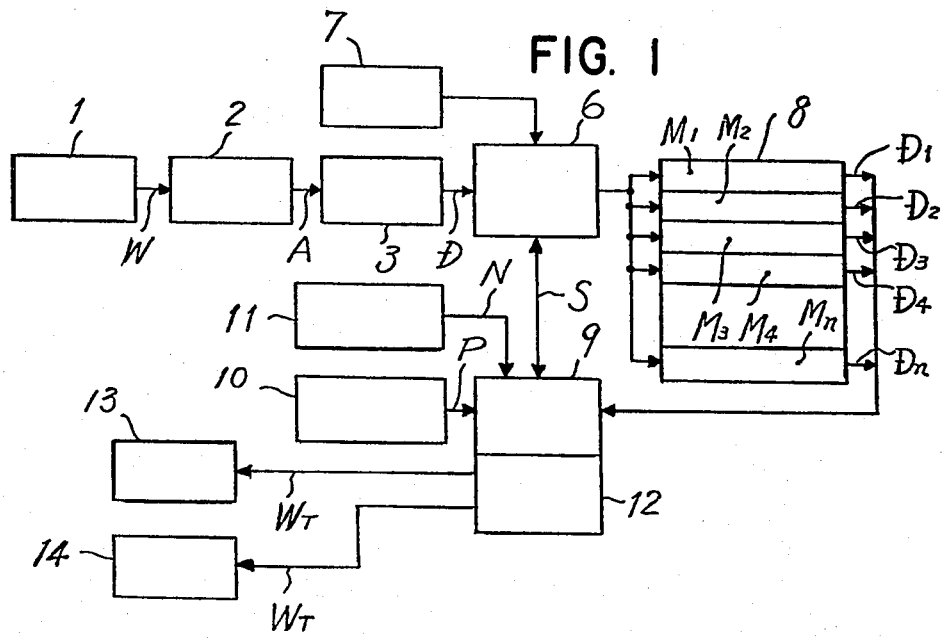
FIG. 1 is a block diagram of the electronic reading balance of an embodiment of the present invention.

Referring to FIG. 1, there is a weighing means 1 with electromagnetic force automatic balancing means and W is the weighing detection signal of DC current which has been measured by means of the weighing means. The signal W is converted into an analog signal A of DC voltage by means of the weight measuring amplifier 2 and then converted into a digital signal D by means of the A/D converter 3. Then, the measurements obtained by means of the weighing means 1 are taken as sampling data at a definite interval of time and then are transmitted to the data input control means 6. A detection level setting means 7 allows automatic printing only at the time of weighing. The level setting means 7 functions to set an optional detecting level for weighing, for example, 20 to 30% of the range of measurement corresponding to the range of measurement. When the digital signal D has come up to the detection level, that is, when detects that a sample for measurement has been placed on the pan (not illustrated) of balance, the input control means 6 immediately turns the printing permission signal to the ON side and stands by.

For example, in case the interval of time for sampling is set at 100 m sec., the data $D_1$ to $D_n$ taken every 100 m sec. are to be memorized by means of a group of the memory registers $M_1$ to $M_n$ of the memory means 8 in the order of sampling. In the means 8 hereinbefore mentioned, the group of memory registers $M_1$ to $M_n$, for example, 16 pieces, are to be given as much capacity of memory as capable of meeting the maximum times to be set for sampling. In this case, the number of memory registers to be operated is to be varied depending on the number of times set and the memorized values are to be renewed per sampling. A comparator 9 functions to compare each data in the order of $(D_{n-1})$, $(D_{n-2})$ ... with the data $D_n$, if the newest data among the data $D_1$ to $D_n$ memorized by means of the memory means 8 is, for example, data $D_n$, wherein the condition of comparison is as follows. First the number of times N of sampling is to be set to be, for example, 4, 8, or 16 by means of the sampling times setting means 10 depending on how many times samplings are taken to determine their average, considering the stability of measurements, and then the maximum allowable difference between the newest data and the previous data memorized being followed to sampling, that is, the allowable range of value of variance of data is to be set within the range of 2 to 40 of digit mode (Minimum indication unit) by means of the allowable range of value setting means 11 within the number of times N of sampling. For example, the value is to be set within the range of 12 to 40 at the time of measurement of the body weight of an experimental animal and is to be set within around the range of 2 to 9 in case there is little vibration. A description of the setting and the function of the comparator 9 is made, referring to the response graph of FIG. 2, as follows.

Figure 2:
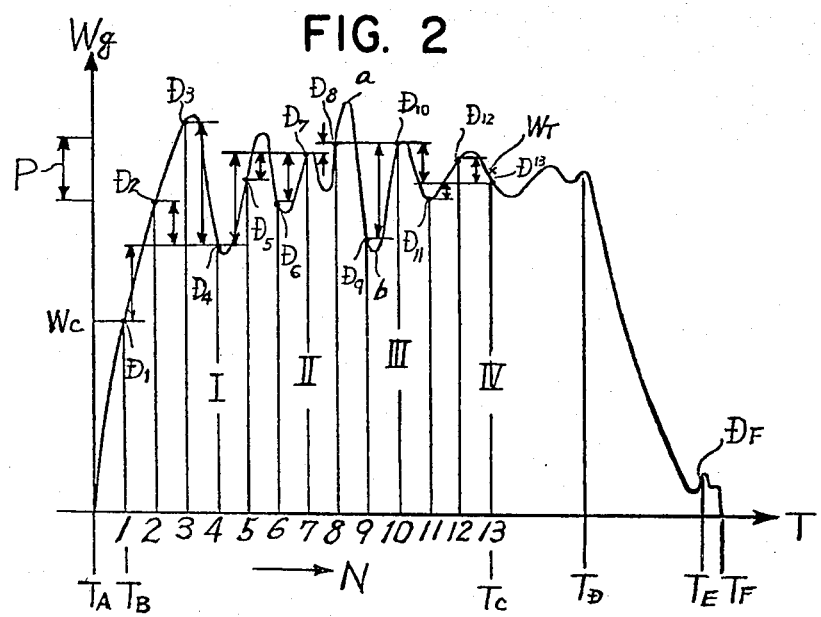
FIG. 2 is a response graph obtained when the electronic reading balance which has been used for measurement of the body weight of an experimental animal.

In the FIG. 2, the axis of ordinate W indicates the variation of measurement (g) of balance and P is the allowable range of value set. If this is set, for example, to 30 digits (for example, to be equivalent to 30 mg in case of 0 to 99.99 g of measuring range), the 30 digits (30 mg) is constant without respect of the indicated measurement W. Wc is the aforementioned detection level, which is to be set, for example, to be within the range of 20 to 30 g. The axis of abscissa T indicates passing time (seconds) in measurement, and 1 to 13 are the number of times N of sampling per 100 m sec. $T_A$ is the time point when an experimental animal has been placed on the pan of the balance and $T_B$ is the time point when the signal D in FIG. 1 has come up to the detection level Wc in FIG. 2, when the printing permission signal turns to the ON side and stands by.

In the FIG. 1, if the number of times N is set to 4 by means of the sampling times setting means 10, the sampling values are to be memorized in sequence to be Data $D_2$, $D_3$, $D_4$ ... in the memory registers $M_1$ to $M_4$, wherein when the newest data $D_4$ has entered therein, the comparator 9 immediately starts the comparing operation on the basis of the data $D_4$ as Standard I in such a way as comparing the data $D_4$ with the data $D_3$, $D_4$ with $D_2$, and $D_4$ with $D_1$ as many times as 3 times in total, and any differences between them which have been found over 30 digits are to be judged rejective and any ones which have been found less than or equivalent to 30 digits are to be judged passed (Refer to FIG. 2). Consequently, any other differences except that between the data $D_4$ and the data $D_2$ are to be rejected because of the response transition stage of balance. Therefore, the comparator 9 transmits the signal S to the control means 6 so that only the data $D_4$ is to be left and other data $D_3$ to $D_1$ are to be eliminated from the memory register $M_3$ to $M_1$. Receiving the signal S, the control means 6 eliminates the data $D_3$ to $D_1$, transfers the data $D_4$ to the memory register $M_1$, and transmits the next new data $D_5$, $D_6$, and $D_7$ taken by sampling to the memory means 8. During the time, the average calculating means 12 is not actuated and the digital indicator 13 does not indicate any numeral indications. For example, the indicator 13 is so arranged that the unit sign (g) and/or the decimal point are made to blink so as to inform the operator of the continuation of the sampling, which is other feature of the present invention. Of course, in this case it is also possible to indicate the value when a sample (that is, an experimental animal) is not placed on the pan of balance yet, which value is generally "zero", or blank. Further, the printer 14 is not actuated to operate and stands by.

In the FIG. 2, when the sampling of data $D_7$ is made, comparison is made between the data $D_7$ with the previous data on the basis of $D_7$ as Standard II, and the result of comparison is that the difference between $D_7$ and $D_4$ is larger than the allowable range of value and is judged to be rejected although the difference between $D_7$ and $D_6$ and that between $D_7$ and $D_5$ are smaller than the allowable range of value and are judged to be passed. Also in this case, therefore, these data $D_6$ to $D_4$ are to be eliminated. Successively, the new data $D_8$, $D_9$, and $D_{10}$ are to be taken as sampling data, and comparison is made between $D_{10}$ and the previous ones on the basis of $D_{10}$ as Standard III, wherein the experimental animal moves violently and consequently the data $D_8$ and $D_9$ located near the maximum point "a" and the minimum point "b" are taken as sampling data, and in this case the difference between $D_{10}$ and $D_9$ is far over the allowable range of value P and therefore $D_9$ is to be rejected. Then no comparison of $D_{10}$ with the previous data $D_8$ and $D_7$ is made and these data are to be eliminated. Following the sampling mentioned above, the next new data $D_{11}$, $D_{12}$, and $D_{13}$ are taken as sampling data and comparison of $D_{13}$ with the previous data on the basis of $D_{13}$ as Standard IV. As the result the difference between $D_{13}$ and $D_{12}$, that between $D_{13}$ and $D_{11}$, and that between $D_{13}$ and $D_{10}$ are all passed. In other words, in this stage the comparator 9 detects that the movement of the experimental animal has settled and consequently the variation of balance has been settled. Therefore, as the average value $W_T$ nearly located to the true average value can be obtained by integrating the measurements of the data $D_{10}$ to $D_{13}$ totalling 4 pieces taken as sampling data in this stage, immediately the average calculating means 12 is to be actuated to operate, the average value $W_T$ rounded to the nearest whole value at its smallest place is to be transmitted to the indicator 13 and the printer 14, and thus the value is to be indicated and printed out as the measurement.

Where printing is not required it is not necessary to provide a printer 14.

In the FIG. 2, $T_D$ is the time point of data indication and printing out, the time between $T_C$ and $T_D$ is the preparation time required to take down the experimental animal subjected to the measurement from the pan of balance, the time between $T_D$ to $T_E$ is the time required for the pan of balance to return to its no-load position, $D_F$ is the weight of any dung and urine of the animal still left on the pan of balance even after the measurement, and $T_F$ is the time point when the weight $D_F$ has been adjusted by zeroing.

At this step, the preparation for placing the next sample (a new experimental animal) on the pan of balance is finished.

INDUSTRIAL APPLICABILITY

As the electronic reading balance relating to the present invention is capable of considerably improving of the measuring accuracy of electronic balance in case the measurement is apt to be affected by vibration of a sample to be measured and accounts for any external disturbances which may disturb the measurement, the electronic reading balance can be utilized very effectively in these fields such as medical science and pharmacy for measurement of the body weight of animals and also in the field of industry for making the quality control in production lines in factory when it is installed in the site thereof. Further, it is effective as a weighing means for use in vibrating objects such as ships and automobiles, etc.

We claim:

1. A weighing balance device designed to provide an average weight to a weighed object which moves such as a laboratory animal, comprising, in combination:
   (a) balance means (1) disposed to receive an object to be weighed and provide an electrical analog output signal corresponding to the weight of the object;
   (b) an amplifier (2) electrically coupled to said balance means (1) so as to receive said analog output signal and convert said analog signal to a value useable by the subsequent circuitry;
   (c) an analog-to-digital converter (3) coupled to said amplifier (2) for receiving said useable signal in analog form and convert it to information in digital form;
   (d) data input control means (6) coupled to said analog-to-digital converter (3) disposed to receive said digital information;
   (e) detector level setting means (7) coupled to said data input control means (6) allowing an output from said control means (6) only when the weight on said balance means (1) reaches a predetermined level;
   (f) memory register means (8) coupled to said control means (6) including a plurality of registers fed by the digital information passing through said control means to store said information;
   (g) comparator means (9) coupled on a first side to said control means (6), on a second side to said memory; and also having third, fourth and fifth sides;
   (h) allowable range means (11) coupled to the third side of said comparator;
   (i) sampling time means (10) coupled to said fourth side;
   (j) average calculating means (12) coupled to said fifth side to average the information provided by said comparator; and,
   (l) utilization means (14) coupled to said average calculator means (12).

2. A device as claimed in claim 1 wherein said utilization means includes printing means (14).

3. A device as claimed in claim 1, said comparator means (9) including elimination means for eliminating all the memorized values when at least one of the differences between the last memorized information value is greater than a predetermined maximum allowable difference so as to allow the transmitting to said memory register means (8) a new group of sampling information values; and, wherein said average calculating means (12) will average all the memorized information values of a group of information values when all said information values are lower than or equal to a maximum allowable set of values predetermined by said elimination means; and, said utilization means (14) being indicating and/or recording means for recording the average value of a group of sampled information values transmitted from said average calculating means.

* * * * *